United States Patent Office 3,215,738
Patented Nov. 2, 1965

3,215,738
N-(SUBSTITUTED-PHENETHYL)-1-HYDROXY-1-CYCLOALKYL-ETHYLAMINES
John Mervyn Osbond, Welwyn Garden City, and James Charles Wickens, St. Albans, England, assignors to Hoffmann-La Roche Inc., Nutley, N.J., a corporation of New Jersey
No Drawing. Filed Jan. 16, 1963, Ser. No. 251,754
Claims priority, application Great Britain, Jan. 24, 1962, 2,552/62
13 Claims. (Cl. 260—570.8)

This invention relates, in general, to novel substituted aza-pentanol compounds and to a process for the production thereof. More particularly, the invention relates to 1,5-disubstituted-3-aza-pentanol-(1) compounds, to salts thereof and to a process for producing same.

The novel aza-pentanol compounds of this invention have the following formula:

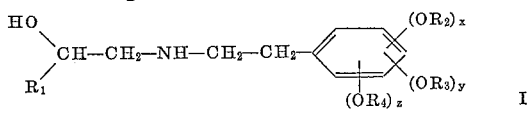

in which $R_1$ is a cyclohexyl, methyl-cyclohexyl, dimethyl-cyclohexyl, cyclohexen-3-yl, methyl-cyclohexen-3-yl or dimethyl-cyclohexen-3-yl radical; $R_2$ is a hydrogen atom or a methyl or ethyl group; $R_3$ is a hydrogen atom or a methyl or ethyl group; $R_4$ is a hydrogen atom or a methyl or ethyl group; $x$ represents 0 or the integer 1; $y$ represents 0 or the integer 1; $z$ represents 0 or the integer 1.

Additionally, salts of these compounds with medicinally acceptable acids, and certain intermediates produced and used in preparing these bases and salts, are encompassed within the scope of this invention.

The compounds of this invention, including the acid-addition salts thereof with medicinally acceptable acids, have been found to be useful as hypotensive agents.

In the practice of this invention, the novel compounds of Formula I are produced by either of two processes. In the first process, one reduces a ketone of the formula:

in which $R_1$ has the same meaning as in Formula I and which X is a chlorine or bromine atom.

Subsequently, the reduction product is dehydrohalogenated and the resulting 1-epoxyethyl compound is condensed with an amine having the formula:

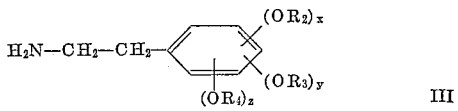

in which the legends $R_2$ $R_3$, $R_4$, $x$, $y$ and $z$ have the same meanings as in Formula I.

Additionally, however, the symbols $R_2$, $R_3$ and $R_4$ in Formula III represent benzyl radicals. Condensation of the 1-epoxyethyl compound, referred to heretofore, with the amine of Formula III yields the desired compound of Formula I. The sole exception to this is those instances in which $R_2$, $R_3$ and/or $R_4$ of the Formula III amine is, or are, benzyl radicals. In such cases, the benzyl group, or groups, is converted to a hydroxy group or hydroxy groups by catalytic hydrogenation.

In the alternate process, the ketone of Formula II is condensed with the amine of Formula III and the condensation product, thus obtained, is, subsequently, catalytically reduced. The end product which is obtained by either of the alternate processes can be converted into an acid addition salt by conventional procedures.

The cyclohexenyl ketones which are employed as the starting material in the practice of this invention are prepared by a Diels-Alder condensation using the unsubstituted or an appropriately 2-substituted-, 3-substituted- or 2, 3-substituted-butadien-(1,3) with 1,4-dichloro-butanone-(2) or 1,4-dibromo-butanone-(2). (See Chem. Abs., 1957, 51, 9503 and 12053.)

The cyclohexyl ketone starting materials of this invention are prepared by treating a hexahydro-benzoic acid halide, or a 3-methyl-, a 4-methyl- or a 3,4-dimethyl derivative thereof, with diazo-methane and treating the resulting diazomethyl ketone with hydrogen chloride or hydrogen bromide. (See J.A.C.S., 1950, 72, 2884; J.A.C.S., 1954, 76, 35; and J.A.C.S., 1957, 79, 3145.)

The reduction of the ketone starting material can, in general, be accomplished by the use of potassium borohydride in ethanol, suitably in the presence of saturated sodium bicarbonate solution, with the reduction being carried out at a temperature within the range of from about 0° to 5° C. Additionally, the starting ketone can be reduced by means of the use of aluminum isopropoxide in isopropanol. In the preferred embodiment of the invention, the reduction is carried out in aluminum isopropoxide in isopropanol. Representative of the halohydrins which are produced in this step of the process are 1-(2-chloro-1-hydroxyethyl) - dimethyl - cyclohexen-(3); 1-(2-chloro-1-hydroxyethyl)-methyl-cyclohexen-(3); and 2-chloro-1-hydroxyethyl-cyclohexane. Where the ketone starting material is bromo- rather than chloro-substituted, reduction of such ketone will yield the bromohydrin compounds corresponding to the chlorohydrin compounds named heretofore.

The dehydrohalogenation of the chloro- or bromohydrin compound can be effected readily by treating the reduction product with a dilute alcoholic alkali metal-metal hydroxide solution at a low temperature. In the preferred embodiment of the invention, the halohydrin compound, in the form of a solution in methanol, is treated with dilute methanolic potassium hydroxide at a temperature below about 0° C. Representative of the novel epoxyethyl compounds which are formed in the dehydrohalogenation step of this process are 1-epoxyethyl - dimethyl - cyclohexen-(3); 1-epoxyethyl-methyl-cyclohexen-(3).

The condensation of the 1-epoxyethyl product of the reduction step with the amine of Formula III is conveniently carried out in the presence of a suitable condensing agent at a temperature of about 20° C. In general, it has been found that sodium hydroxide, sodium carbonate and sodium acetate are well suited for use as the condensation agents. In the preferred embodiment of the invention, sodium hydroxide is employed as the condensing agent and the condensation step is carried out at a temperature of about 20° C. Moreover, the condensation may be effected advantageously in a nitrogen atmosphere. In the alternative, the condensation can be accomplished by heating the epoxyethyl compound with the amine at an elevated temperature.

Where, in the practice of the present invention, a ketone starting material of Formula II is condensed initially with the amine of Formula III, this reaction can be carried out by mixing the reactants at a relatively low temperature. Preferably, this condensation reaction is carried out at a temperature of about −20° C. Moreover, where the amine is condensed directly with the starting ketone, it is preferred to use two molar proportions of the amine for each mole of ketone employed and to effect the condensation in the presence of a solvent. The condensation product, which is obtained by such reaction, is subsequently reduced, catalytically, with hydrogen using Raney nickel as the catalyst at a temperature of about 20° C. and at atmospheric pressure.

As indicated heretofore, the present invention embodies the compounds of Formula I as well as their acid addition salts. In general, all salts formed by the reaction of the Formula I compounds with medicinally acceptable inorganic or organic acids are included within the scope of the invention. The preferred acid addition salts, however, are those prepared by reacting the base either with an inorganic acid, such as hydrochloric acid, hydrobromic acid, sulfuric acid or with a conventional organic acid, such as tartaric acid, citric acid. Furthermore, the cyclohexenyl compounds of this invention, as well as the salts thereof, can be catalytically reduced to the corresponding cyclohexyl compounds and salts. Palladium/charcoal is a useful catalyst for the latter purpose.

The novel hydroxy-substituted phenyl-aza-pentanol-(1) compounds of this invention can be produced using an amine compound (Formula III) in which one or more of the legends $R_2$, $R_3$ and $R_4$ represent a benzyl group. In one of the final steps of the process, any benzyl group present in the compound is converted to a hydroxy group by catalytic hydrogenation. Illustrative of this embodiment of the invention is the preparation of hydroxy-phenyl-aza-pentanol-(1) compounds by the hydrogenation, for example, of 1-[3,4-dimethyl-cyclohexen-3-yl]-5-(3-benzyloxy-4-methoxyphenyl)-3-aza-pentanol-(1) or 1-[3,4 - dimethyl - cyclohexen-3-yl]-5-(4 - benzyloxy-3-methoxyphenyl)-3-aza-pentanol-(1).

As indicated heretofore, the novel aza-pentanol compounds of this invention possess valuable pharmacological properties. Specifically, these compounds are useful as hypotensive agents. These compounds can be used as medicaments, for example, in the form of suitable pharmaceutical preparations. These compounds, as well as acid addition salts thereof, can be used as such or they can be used in admixture with other compounds. For example, the compounds of this invention can be mixed with inert adjuvants, either organic or inorganic in nature, such as gelatin, lactose, starch, magnesium stearate, talc, polyalkylene glycols and Vaseline. The preparations can be provided in the form of tablets or they can be incorporated into suitable hard-shelled capsules. If desired, these pharmaceutical preparations can be stabilized and/or mixed with adjuvant materials such as preservatives, stabilizers, wetting or emulsifying agents, salts for altering osmotic pressure, or buffers. If desired, they can be used also in combination with other therapeutically valuable substances.

As but one example of the foregoing, tablets have been prepared using 10.0 grams of one of the therapeutically active compounds of this invention, such as 1-[3,4-dimethyl-cyclohexen - (3)-yl]-5 - (3,4-dimethoxyphenyl)-3-aza-pentanol-(1) hydrochloride, 159.0 grams of a granulate of lactose and starch, 5.0 grams of talc and 1.0 gram of magnesium stearate. In producing these tablets, the therapeutically active compound is intimately mixed with the granulate and the talc and magnesium stearate are added thereto. The mixture, thus obtained, is then compressed, crushed and recompressed to give tablets weighing 175 mg. each, each tablet containing 10.0 mg. of the active compound.

For a fuller understanding of the nature and objects of this invention, reference may be had to the following examples which are given merely as further illustrations of the invention and are not to be construed in a limiting sense.

*Example 1.—I(a) Preparation of 1-(2-chloro-1-hydroxyethyl)-3,4-dimethyl-cyclohexen-(3)*

In this example, 5 liters of ethanol, 3 liters of a saturated sodium bicarbonate solution and 746.72 grams of 1-chloracetyl-3,4-dimethyl-cyclohexen-(3) were charged into a 10 liter, round bottom flask which was fitted with a stirrer, solid addition funnel and a thermometer. This mixture was stirred vigorously and cooled to a temperature of about 5° C. in an ice bath. Thereafter, 118.69 grams (2.2 mole) of potassium borohydride were then added to the mixture, in small portions, over a period of about three hours. It was observed that, after each addition of the potassium borohydride, the temperature of the mixture rose to about 10° C. The reaction mixture was, after each such addition, cooled once again to a temperature of about 5° C. When the addition of the potassium borohydride was completed, the mixture was stirred for an additional two-hour period at a temperature of 5° C. and, thereafter, the reaction mixture was stored at that temperature for a period of about 16 hours.

Subsequently, the reaction mixture was filtered. The solid product thus obtained was washed twice with ethanol, following which the ethanol was removed by heating the product on a water bath under reduced pressure. Thereafter, 2.0 liters of water were added to the residue and the aqueous product was extracted three times, using 650 ml. of ether each time. The ether extracts were combined and they were washed twice, using 200 ml. of water each time, following which the ether layer was separated from the aqueous layer. The ether layer was dried over sodium sulfate, filtered and the filtrate was evaporated to dryness under reduced pressure. The residue was distilled using a high vacuum pump, the fractions distilling off at a bath temperature of between 140° C. to 160° C. (internal temperature 103°–118° C.)/0.7–1.0 mm. being collected.

By this procedure, there was obtained 1-(2-chloro-1-hydroxyethyl)-3,4-dimethyl-cyclohexen-(3) in a yield of 612 grams of 81.4% of theory. This compound had a boiling point within the range of 92°–94° C./0.075 mm.; $N_D^{20}=1.5037$.

*I(b) Alternate preparation of 1-(2-chloro-1-hydroxyethyl)-3,4-dimethyl-cyclohexen-(3)*

There was introduced into a 2 liter, 4-necked flask, 107.25 grams (0.525 mole) of aluminum isopropoxide in a liter of dry isopropanol. This solution was heated to a temperature of about 110° C. and, with stirring, 93.37 grams (0.5 mole) of 1-chloroacetyl-3,4-dimethyl-cyclohexen-(3) was added thereto over a period of about five minutes. Any ketone, remaining in the vessel from which it was charged into the reaction mixture, was washed into the reaction mixture by means of the use of 200 ml. of isopropanol. The reaction mixture was then heated to its boiling point (oil-bath temperature=120° C.) and it was heated at reflux for about twenty minutes. At the end of that period, the reaction mixture was cooled rapidly with ice-water to a temperature of about 25° C. Thereafter, about 600 ml. of isopropanol were removed under reduced pressure at a water-bath temperature of 40° to 45° C. The residue was then poured onto a mixture of ice, water and 150 ml. of concentrated hydrochloric acid, with stirring. The product is then extracted three times, using 500 ml. of ether each time. The ether extracts were combined, washed twice, using 200 ml. of water each time, and dried over sodium sulfate. The ether was removed under reduced pressure and the residue was distilled to yield 86.71 grams, or 91.9% of theory, of 1-(2-chloro-1-hydroxyethyl)-3,4-dimethyl-cyclohexen-(3), distilling over a bath temperature of about 145° to 155° C. (internal temperature 102° to 116° C.)/0.8 to 1.0 mm.

*II Preparation of 1-epoxyethyl-3,4-dimethyl-cyclohexen-(3)*

613.3 grams (3.25 mole) of 1-(2-chloro-1-hydroxyethyl) - 3,4 - dimethyl - cyclohexen-(3), produced as described in the preceding paragraphs of this example, was added to 900 ml. of methanol and this mixture was introduced into a 5 liter, round bottom flask which was fitted with a stirrer, thermometer and dropping funnel. The solution was cooled to a temperature of about −15°

C. in an ice-salt mixture. Thereafter, a solution of 214.5 grams (3.25 mole) of 85% potassium hydroxide, dissolved in 2 liters of water, was slowly added over a period of about 2½ hours. The mixture was cooled to a temperature of about 0° C. It was stirred for a period of about two hours at that temperature, following which it was maintained at a temperature of 5° C. for a period of about 16 hours. The reaction mixture was subsequently filtered to remove therefrom the potassium chloride which had separated out. Thereafter, the potassium chloride was washed twice with methanol. The methanol washings were combined with the filtrate and, subsequently, the methanol was removed on a water bath at a temperature of from about 35° to 40° C., under reduced pressure.

The residue which remained was mixed with 1.5 liters of water and this mixture was extracted three times, using 650 ml. of ether each time. The ether extracts were combined and the combined extracts were washed twice, using 400 ml. of water each time. Thereafter, the ether layer was separated from the aqueous layer and ether layer was dried over sodium sulfate. The ether solution was then filtered, concentrated and distilled under reduced pressure. There was collected 426.06 grams, or 86.1% of theory, of fractions distilling off at a bath temperature of 130° to 140° C. (internal temperature 102° to 108° C.)/12 mm. This product was identified as 1-epoxyethyl-3,4-dimethyl-cyclohexen-(3).

III Preparation of 1-[3,4-dimethyl-cyclohexen-(3)-yl]-5-(3,4-dimethoxyphenyl)-3-aza-pentanol-(1) hydrochloride 182.64 grams (1.2 mole) of 1-epoxyethyl-3,4-dimethyl-cyclohexen-(3), produced as described in the preceding paragraphs, 260.4 grams (1.32 mole) of (3,4-dimethoxyphenyl)-ethyl amine and 140 ml. of 2 N sodium hydroxide solution were introduced into a 3-neck flask of 1 liter capacity. This mixture was stirred vigorously, under nitrogen, at a temperature of about 20° C. for a period of about 90 hours. A thick, colorless, paste-like product was thus obtained. To this product there was added 600 ml. of water and the mixture was extracted three times, using 500 ml. of ether each time. The ether extracts were combined and washed once with water. Subsequently, the combined ether extracts were dried over sodium sulfate. All of these steps were carried out under an atmosphere of nitrogen. The ether was then removed by heating on a water bath at a temperature of from about 20° to 25° C. under reduced pressure.

The residue, thus obtained, was a colorless, partially solid product. This residue was dissolved in 250 ml. of methanol and about 250 ml. of ethereal hydrogen chloride (i.e. ether saturated with hydrogen chloride at 0° C.) was added thereto with stirring, under nitrogen, at 0° C. During this step of the process, an additional 300 ml. of ether were added to the reaction mixture to facilitate stirring.

The mixture, thus obtained, was maintained overnight at a temperature of about 0° C. The mixture was filtered and the solid material which was retained on the filter was washed with 250 ml. of ether. The solid material was subsequently filtered dry under suction and then it was suspended in 1200 ml. of 2 N hydrochloric acid. This mixture was stirred, under a nitrogen atmosphere, at a temperature of about 20° C. for about 30 minutes. The solid which separated from the solution was removed by filtration and it was dried, in vacuo, over phosphorus pentoxide at a temperature of 20° C. for a period of several days. This product was then added, with stirring, to 3600 ml. of boiling isopropanol. The product dissolved rapidly, and, immediately upon its dissolution, the solution was filtered while hot, through fluted filter paper. A clear, pale yellow filtrate was obtained and it was maintained at a temperature of about 0° C. under nitrogen for a period of about 16 hours. Upon filtration, there was obtained 332 grams, or 52.3% of theory, of 1-[3,4-dimethyl - cylcohexen-3-yl]-5-(3,4-dimethoxyphenyl) - 3-aza-pentanol-(1) hydrochloride. This compound was washed with isopropanol and dried, in vacuo, over phosphorus pentoxide at a temperature of about 20° C. The salt was, thereafter, exposed to the air in the dark for a period of about 12 hours to remove therefrom traces of odor. This salt, which had a melting point of 159.5° to 162.5° C., with decomposition, was obtained in the form of colorless crystals, which crystals were proved to be analytically pure.

For the sake of completeness, the preparation of the 1-chloroacetyl-3,4-dimethyl-cyclohexen - (3), the starting material used in this example, is given below although it should be understood that neither the compound, nor the process for its preparation, comprises a part of the instant invention.

In this processs 3420 ml. of dioxane, 180 ml. of water, 643.3 grams (6.65 mole) of potassium acetate and 1.0 gram of hydroquinone were introduced into a 10 liter, 3-neck, round bottom flask, fitted with a stirrer, dropping funnel and double surface condenser. To the suspension, thus obtained, there was added, with stirring, 451.77 grams (5.5 mole) of 2,3-dimethyl-butadien-(1,3), followed by the addition of 853.11 grams (6.05 mole) of 1,4-dichloro-butanone-(2) at a temperature of about 20° C. for about 15 minutes. Upon stirring the mixture, an increase in the internal temperature of the reaction mixture was noted. The mixture was stirred at a temperature of about 20° C. for a period of about one hour. Subsequently, the reaction mixture was heated at a temperature of 45° C. for a period of about 16 hours. At the latter temperature, a mild, exothermic reaction was observed to occur, with the internal temperature of the reaction mixture tending to rise to about 55° C.

A thick, paste-like mixture was obtained by this procedure. This mixture was filtered and the residual potassium chloride was washed three time with dioaxane. The filtrate was concentrated to a syrup on a water bath at a temperature of about 40° C. under reduced pressure. To this syrup there was added 2 liters of water and the aqueous mixture was extracted three times, using 1.0 liter of ether each time. The ether extracts were combined and they were washed two times, using 500 ml. of water each time. The ether layer was separated from the aqueous layer and, thereafter, the ether layer was dried over sodium sulfate. After filtration, the mixture was concentrated and distilled under reduced presssure.

The fractions which were distilled off at a bath temperature of 130° to 150° C. (internal temperature 102° to 116° C.)/0.7–0.8 mm. were collected and combined to yield 793.72 grams, or 77% of theory, of 1-chloroacetyl-3,4-dimethyl-cyclohexen-(3), boiling at 82° to 84° C./0.15 mm.; $N_D^{20}$=1.4972.

Example 2.—Preparation of 1,-[3-dimethyl-cyclohexen-(3)-yl]-5-(3,4-dimethyphenyl)-3-aza - pentanone - (1) hydrochloride In this example, 18.65 grams (0.1 mole) of 1-chloroacetyl-3,4-dimethyl-cyclohexen-(3) which compound was produced by the method described in Example 1, was dissolved in 50 ml. of dry ether and that solution was mixed with a solution of 36.2 grams (0.2 mole) of (3,4-dimethoxy-phenyl)-ethyl amine dissolved in 75 ml. of dry ether. Prior to mixing same, the solutions were cooled to a temperature of about —20° C. The temperature of the mixture was allowed to rise to within the range of from about 0° to 5° C. and the mixture was maintained within that temperature range for a period of about 24 hours. Subsequently, 50 ml. of dry ether was then added to the mixture, following which 16.84 grams of (3,4-dimethoxy-phenyl)-ether amine hydrochloride were removed by filtration. The filtrate was concentrated under reduced pressure and the residue was treated with methanol and ethereal hydrogen chloride. There was obtained 1-

[3,4 - dimethyl - cyclohexen - 3 - yl]-5-(3,4-dimethoxyphenyl)-3-aza-pentanone-(1) hydrochloride in a yield of 5.88 grams, or 16% of theory, melting at 191° to 196° C. After recrystallization of this product from ethanol, the hydrochloride salt, melting at 196.5° to 200° C., was obtained.

*Preparation of 1-[3,4-dimethyl - cyclohexen-(3)-yl]-5-(3, 4-dimethoxyphenyl)-3-aza-pentanol-(1) hydrochloride*

1.84 gram (0.002 mole) of 1-[3,4-dimethyl-cyclohexen-3-yl]-5 - (3,4-dimethylphenyl) - 3-aza-pentanone-(1), prepared as described in the preceding paragraph, was dissolved in 50 ml. of methanol and this compound was reduced with hydrogen using Raney nickel catalyst at a temperature of 20° C. and at atmospheric pressure. After 128 ml. of hydrogen had been taken up, the reaction rate slowed down appreciably and the hydrogenation was discontinued. The reaction mixture was filtered, the filtrate was concentrated and the residue was treated with ether containing a small quantity of hydrogen chloride. By this procedure, there was obtained 1.5 gram, or 81% of theory, of 1-[3,4-dimethyl - cyclohexen-3-yl] - 5 - (3,4-dimethoxyphenyl)-3-aza-pentanol-(1) hydrochloride, melting point at 162° to 164° C.

By the same procedure as is described in detail in this example, the following compounds were prepared:

1-[3,4-dimethyl-cyclohexen - 3 - yl] - 5 - phenyl - 3-aza-pentanol-(1) hydrochloride, melting point at 203.5° to 207° C. [from 1-chloroacetyl-3,4-dimethylcyclohexen-(3) and phenethylamine].

1-[3,4-dimethyl-cyclohexen-3-yl] - 5 - (2-methoxyphenyl)-3-aza-pentanol-(1) hydrochloride, melting point at 120° to 125° C. [from 1-chloroacetyl-3,4-dimethyl-cyclohexen-(3) and (2-methoxyphenyl)-ethyl amine].

1-[3,4-dimethyl-cyclohexen-3-yl]-3-(3-methoxyphenyl)-3-aza-pentanol-(1) hydrochloride, melting point at 219° to 221° C. [from 1-chloroacetyl-3,4-dimethylcyclohexen-(3) and (3-methoxyphenyl)-ethyl amine].

1-[3,4-dimethyl-cyclohexen-3-yl]-5-(4-methoxyphenyl)-3-aza-pentanol-(1) hydrochloride, melting point at 219° to 221° C. [from 1-chloroacetyl-3,4-dimethylcyclohexen-(3) and (4-methoxyphenyl)-ethyl amine].

1-[3,4-dimethyl - cyclohexen - 3 - yl] - 5 - (3,4-diethoxyphenyl)-3-aza-pentanol-(1) hydrochloride, melting point at 160.5° to 163.5° [from 1-chloroacetyl - 3,4 - dimethyl-cyclohexen-(3) and (3,4-diethoxyphenyl)-ethyl amine].

1-[3,4-dimethyl-cyclohexen-3-yl] - 5 - (3 - ethoxy-4-methoxyphenyl)-3-aza-pentanol-(1) hydrochloride, melting point at 145° to 150° C. [from 1-chloroacetyl-3,4-dimethylcyclohexen-(3) and (3-ethoxy-4-methoxyphenyl)-ethyl amine].

1-[3,4-dimethyl - cyclohexen - 3-yl] - 5 - (3-methoxy-4-ethoxyphenyl)-3-aza-pentanol-(1), melting point at 142° to 145° C. [from 1-chloroacetyl-3,4-dimethyl-cyclohexen-(3) and (3-methoxy-4-ethoxyphenyl)-ethyl amine].

*Example 3*

In this example, 14.85 grams of (3,4,5-trimethoxyphenyl)-ethyl amine hydrochloride and a solution of 2.5 grams of sodium hydroxide in 10 ml. of water were mixed, with cooling, to liberate the free base from the hydrochloride salt. To this mixture there was added 7.65 grams of 1-epoxyethyl-3,4-dimethyl-cyclohexen-(3). The latter compound was prepared by the procedure described in Example 1. The mixture, thus obtained, was agitated for a period of about 68 hours at a temperature of about 20° C., following which water is added thereto. The mixture was then extracted twice with ether. After removal of the ether, the base was dissolved in methanol and treated with ethereal hydrogen chloride. By this procedure, there was obtained 11.01 grams of 1-[3,4-dimethyl-cyclohexen-3-yl] - 5 - (3,4,5-trimethoxyphenyl)-3-aza-pentanol-(1) hydrochloride, melting point at 135.5° to 140° C. For purification purposes this compound was suspended in 2 N hydrochloric acid for 30 minutes at a temperature of about 20° C., the suspension was filtered and the product which was obtained was recrystallized from a mixture of methanol and ether. The pure hydrochloride salt, melting at 149° to 151° C., crystallized from the mixture of methanol and ether in the form of colorless prisms.

*Example 4*

In this example, 9.79 grams of (4-benzyloxy-3-methoxyphenyl)-ethyl amine hydrochloride was suspended in water and the suspension was made alkaline using 2 N sodium hydroxide solution. This suspension was extracted with ether and the base was agitated, under nitrogen, with 5.1 grams of 1-epoxyethyl - 3,4 - dimethyl-cyclohexen-(3), the latter prepared as described in Example 1, 2 ml. of 2 N sodium hydroxide solution and 2 ml. of ethanol for a period of about 96 hours at a temperature of about 20° C. The reaction mixture was worked up by the procedure described in Example 3.

By such procedure there was obtained 9.83 grams of crude 1-[3,4-dimethyl-cyclohexen-3-yl] - 5 - (4-benzyloxy-3-methoxyphenyl)-3 - aza - pentanol - (1) hydrochloride, melting point at 140° to 147° C. This crude salt was suspended in water, the suspension was filtered and the product, thus obtained, was, thereafter, recrystallized two times from ethanol. The pure 1-[3,4-dimethyl-cyclohexen-3-yl] - 5 - (4 - benzyloxy - 3 - methoxyphenyl) - 3-aza-pentanol-(1) was obtained, in the form of its hydrochloride salt, melting point at 165° to 168° C.

1.12 gram of 1-[3,4-dimethyl-cyclohexen-3-yl]-5-(4-benzyloxy-3-methoxyphenyl - 3 - aza-pentanol-(1) hydrochloride, produced in the manner described in the preceding paragraph, was mixed with 20 ml. of methanol. While in admixture with methanol, this compound was hydrogenated at 20° C. and atmospheric pressure over palladium/charcoal. After 65 ml. of hydrogen had been taken up, the reaction mixture was filtered and the filtrate, thus obtained, was diluted with ether. Upon dilution with ether, 0.78 gram, or 87% of theory, of 1-[3,4-dimethyl-cyclohexen-3-yl] - 5 - (4 - hydroxy - 3 - methoxy) - 3-aza-pentanol-(1) hydrochloride, melting at 171° to 178° C., precipitated out. The pure hydrochloride salt, after recrystallization from methanol, had a melting point of 180° to 184° C.

The following-named compound was also prepared by the process described in this example:

1-[3,4 - dimethyl - cyclohexen - 3 - yl] - 5 - (3-hydroxy-4-methoxyphenyl) - 3 - aza - pentanol - (1) hydrochloride, melting point at 195° to 198° C. [from (3-benzyloxy-4-methoxyphenyl)-ethyl amine hydrochloride and 1-epoxyethyl-3,4-dimethyl-cyclohexen-(3)].

*Example 5*

In this example, 350 ml. of saturated sodium bicarbonate solution were added to 69.04 grams of 1-chloroacetyl-methyl-cyclohexen-(3) in 1.0 liter of ethanol. To this mixture, at a temperature of 0° C., 15.7 grams of potassium borohydride were added gradually over a period of about 30 minutes. The mixture, thus obtained, was stirred for a period of about 16 hours at a temperature within the range of from about 0° to 15° C. The solvent was removed under reduced pressure and 41.05 grams of the resulting 1-(2-chloro-1-hydroxy-ethyl)-methyl-cyclohexen-(3) were extracted with ether and distilled, boiling point 72° to 80° C./0.3 mm.

Thereafter, 100 ml. of 1 N potassium hydroxide were added, gradually over a period of about 2 hours, to a solution of 17.47 grams of 1-(2-chloro-1-hydroxy-ethyl)-methyl-cyclohexen-(3), produced as described in the preceding paragraph, in 30 ml. of methanol. During the addition, which was accompanied with stirring, the chlorohydrin solution was maintained at temperature of about 0° C. The reaction mixture was then stirred at a temperature of about 20° C. for a period of about 3 hours, following which the solvent was removed under reduced pressure, water was added and the epoxyethyl compound was extracted with ether and dried over sodium sulfate. By this procedure, there was obtained 8.67 grams of 1-epoxyethyl-methyl-cyclohexen-(3), boiling point 78° C./7 mm.; N_D^20=1.4722.

A mixture of 6.91 grams of 1-epoxyethyl-methyl-cyclohexen-(3), produced as described in the preceding paragraph and 9.06 grams of (3,4-dimethoxyphenyl)-ethyl amine were heated on a boiling water bath for a period of about 4 hours. At the end of that time, the excess of amine (5.27 grams) was distilled off (boiling point 120° to 122° C./0.3 mm.). The residue, thus obtained, was dissolved in methanol and it was converted to a hydrochloric acid salt by the addition of ethereal hydrogen chloride. The product, 1-[methyl-cyclohexen-(3)-yl]-5-(3,4-dimethoxyphenyl)-3-aza-pentanol-(1) hydrochloride, was thus obtained with melting point of 168° to 174° C. This compound crystallized as colorless prisms from methanol/ether.

Thereafter, 3.56 grams of 1-[methyl-cyclohexen-3-yl]-5-(3,4-dimethoxyphenyl)-3-aza-pentanol-(1) hydrochloride, produced as described in the preceding paragraph, were added to 50 ml. of methanol and that compound was hydrogenated therein at a temperature of about 20° C. and atmospheric pressure in the presence of 2.0 grams of 5% palladium/charcoal. After an uptake of 308 ml. of hydrogen at a temperature of about 22° C., the reaction was halted and the solution was filtered and concentrated. There was thus obtained after two crystallizations from isopropanol, 1.77 grams of 1-[methyl-cyclohexyl]-5-(3,4-dimethoxyphenyl)-3-aza-pentanol-(1) hydrochloride, melting point at 188.5° to 191.5° C. Upon recrystallization of the compound, a yield of 1.16 grams was obtained.

*Example 6*

In this example, the starting material employed was chloroacetyl-cyclohexane. This compound was prepared from hexahydro-benzoic acid chloride by treatment of diazo-methane and the subsequent treatment of diazomethyl ketone, thus obtained, with hydrochloric acid.

Chloroacetyl-cyclohexane (30.5 grams) were added to 270 ml. of ethanol and 167 ml. of saturated sodium bicarbonate solution was added thereto. The compound was reduced at a temperature of about −10° C. by the gradual addition of 7.5 grams of potassium borohydride over a period of about 45 minutes. When the reduction was completed, ethanol was removed by distillation at 35° C. and water was added to the residue. The product was taken up in ether and distilled to give 26.5 grams (86% of theory) of (2-chloro-1-hydroxyethyl)-cyclohexane, in the form of a colorless oil, boiling point at 64° to 65.5° C./0.6 mm.

A solution was prepared of 26.56 grams of (2-chloro-1-hydroxyethyl)-cyclohexane, produced as described in the preceding paragraph, in 50 ml. of methanol. At a temperature of 0° C., and over a period of two hours, 81.6 ml. of a methanolic solution of potassium hydroxide (prepared from 13.2 grams of potassium hydroxide in 100 ml. of methanol) were added the methanol solution of the chlorohydrin. The reaction mixture was stirred for a period of three hours after the addition of potassium hydroxide solution was completed, following which the methanol was removed and water was added to the residue. The product was taken up in ether, dried and distilled to give 16.7 grams (81% of theory) of 1-epoxyethyl-cyclohexane, boiling point at 83° C./30 mm., in the form of a colorless oil.

Subsequently, 6.31 grams of 1-epoxyethyl-cyclohexane, 10.87 grams of (3,4-dimethoxyphenyl)-ethyl amine and 10 ml. of water were shaken at a temperature of about 20° C. for a period of 68 hours. By this method, 15.43 grams of the 1-cyclohexyl-5-(3,4-dimethoxyphenyl)-3-aza-pentanol-(1) separated out as a colorless white solid. After crystallization from ethyl acetate, this compound had a melting point of 104° to 108° C. The hydrochloride salt of this base was prepared by treatment of the base with an ethereal-methanolic solution of hydrogen chloride. The hydrochloride salt, which forms needles when recrystallized from isopropanol, has a melting point of 159° to 161.5° C.

We claim:
1. A compound selected from the group consisting of a member having the formula:

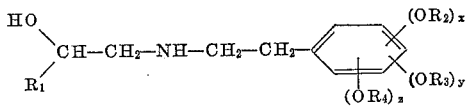

in which $R_1$ is a member selected from the group consisting of a cyclohexyl, methyl-cyclohexyl, dimethyl-cyclohexyl, cyclohexen-3-yl, methyl-cyclohexene-3-yl and dimethyl-cyclohexen-3-yl; $R_2$ is a member selected from the group consisting of hydrogen, methyl and ethyl; $R_3$ is a member selected from the group consisting of hydrogen, methyl and ethyl; $R_4$ is a member selected from the group consisting of hydrogen, methyl and ethyl; $x$ is a member selected from the group consisting of 0 and 1; $y$ is a member selected from the group consisting of 0 and 1; and $z$ is a member selected from the group consisting of 0 and 1; and acid addition salts thereof with medicinally acceptable acids.

2. 1-[3,4-dimethyl-cyclohexen-3-yl]-5-(3,4-dimethoxyphenyl)-3-aza-pentanol-(1).
3. A salt of the compound of claim 2 with a medicinally acceptable acid.
4. 1-[methyl-cyclohexen-3-yl]-5-(3,4-dimethoxyphenyl)-3-aza-pentanol-(1).
5. A salt of the compound of claim 4 with a medicinally acceptable acid.
6. 1-[3,4-dimethyl-cyclohexen-3-yl]-5-(3-methoxy-4-hydroxyphenyl)-3-aza-pentanol-(1).
7. A salt of the compound of claim 6 with a medicinally acceptable acid.
8. 1-[3,4-dimethyl-cyclohexen-3-yl]-5-(3-hydroxy-4-methoxyphenyl)-3-aza-pentanol-(1).
9. A salt of the compound of claim 8 with a medicinally acceptable acid.
10. 1-[3,4-dimethyl-cyclohexen-3-yl]-5-(3-methoxy-4-ethoxyphenyl)-3-aza-pentanol-(1).
11. A salt of the compound of claim 10 with a medicinally acceptable acid.
12. 1-[3,4-dimethyl-cyclohexen-(3)-yl]-5-(3-benzyloxy-4-methoxyphenyl)-3-aza-pentanol-(1) hydrochloride.
13. 1-[3,4-dimethyl-cyclohexen-(3)-yl]-5-(4-benzyloxy-3-methoxyphenyl)-3-aza-pentanol-(1) hydrochloride.

References Cited by the Examiner

UNITED STATES PATENTS

| | | | |
|---|---|---|---|
| 2,152,003 | 3/39 | Van Peski et al. | 260—34 |
| 2,467,171 | 4/49 | Werner | 260—348 |
| 2,539,341 | 1/51 | Allenby et al. | 260—617 |
| 2,541,670 | 2/51 | Segall | 260—348 |
| 2,597,247 | 5/52 | Kerwin et al. | 260—570.8 |
| 2,601,275 | 6/52 | Gump et al. | 260—570.8 |
| 2,691,680 | 10/54 | Goodson et al. | 260—570.8 |
| 2,816,059 | 12/57 | Mills | 260—570.6 |
| 2,900,415 | 8/59 | Biel | 260—570.6 |
| 2,987,556 | 6/61 | Brill | 260—617 |
| 3,014,966 | 12/61 | Freifelder et al. | 260—570.8 |
| 3,046,280 | 7/62 | Kralt et al. | 260—570.8 |

OTHER REFERENCES

Burger, "Medicinal Chemistry," 2nd ed., page 598 (1960).

Moed et al., "Recueil," vol. 74, pages 919–36 (1955).

CHARLES B. PARKER, *Primary Examiner.*

JOHN D. RANDOLPH, NICHOLAS S. RIZZO,
*Examiners.*

UNITED STATES PATENT OFFICE
CERTIFICATE OF CORRECTION

Patent No. 3,215,738                                                    November 2, 1965

John Mervyn Osbond et al.

It is hereby certified that error appears in the above numbered patent requiring correction and that the said Letters Patent should read as corrected below.

Column 4, line 32, for "grams of 81.4%" read -- grams or 81.1% --; lines 63 and 64, for "over a bath" read -- over at a bath --; column 5, line 68, for "pentroxide" read -- pentoxide --; column 6, line 55, for "1,-[3-dimethyl-" , in italics, read -- 1-[3,4-dimethyl- --, in italics; line 56, for "(3,4-dimethyphenyl)", in italics, read -- (3,4-dimethoxyphenyl) --, in italics; line 72, for "-ether amine" read ---ethyl amine --; column 7, line 35, for "3-yl]-3-" read -- 3-yl]-5- --; lines 47 and 48, for "4-meethoxyphenyl" read -- 4-methoxyphenyl --.

Signed and sealed this 18th day of October 1966.

(SEAL)
Attest:

ERNEST W. SWIDER                                        EDWARD J. BRENNER
Attesting Officer                                     Commissioner of Patents